United States Patent

[11] 3,618,731

| [72] | Inventors | Ralph W. Jindrich<br>Clarendon Hills, Ill.;<br>Alan W. Speicher, Evansville; Michael G. Forman, Newburg, Ind. |
|---|---|---|
| [21] | Appl. No. | 843,407 |
| [22] | Filed | July 22, 1969 |
| [45] | Patented | Nov. 9, 1971 |
| [73] | Assignee | Bliss & Laughlin Industries, Incorporated<br>Oak Brook, Ill. |

[54] MATERIAL-HANDLING ASSEMBLY OF UNITS HAVING SELF-CONTAINED CONNECTORS
11 Claims, 10 Drawing Figs.

[52] U.S. Cl..................................................... 193/35, 193/37
[51] Int. Cl........................................................ B65g 13/00
[50] Field of Search............................................ 193/35, 36, 37, 35 C, 35 T, 35 E, 25, 25 IE, 25 FT

[56] References Cited
UNITED STATES PATENTS

| 2,964,154 | 12/1960 | Erickson | 193/35 |
| 3,236,550 | 2/1966 | Falkler | 193/35 |
| 3,509,978 | 5/1970 | Bedford | 193/35 |

Primary Examiner—Andres H. Nielsen
Attorney—Woodard, Weikart, Emhardt & Naughton ABSTRACT: Conveyor units each comprising a pair of rails having a plurality of rollers journaled therein. Each unit has a plurality of transverse brackets on the upper and lower margins thereof, the brackets having U-shaped ends for assembling units in a side-by-side relationship. U-shaped brackets are also on the ends of each unit for end-to-end assembly and locking. The units are adapted to be assembled in an alternately inverted arrangement to serve as a dolly.

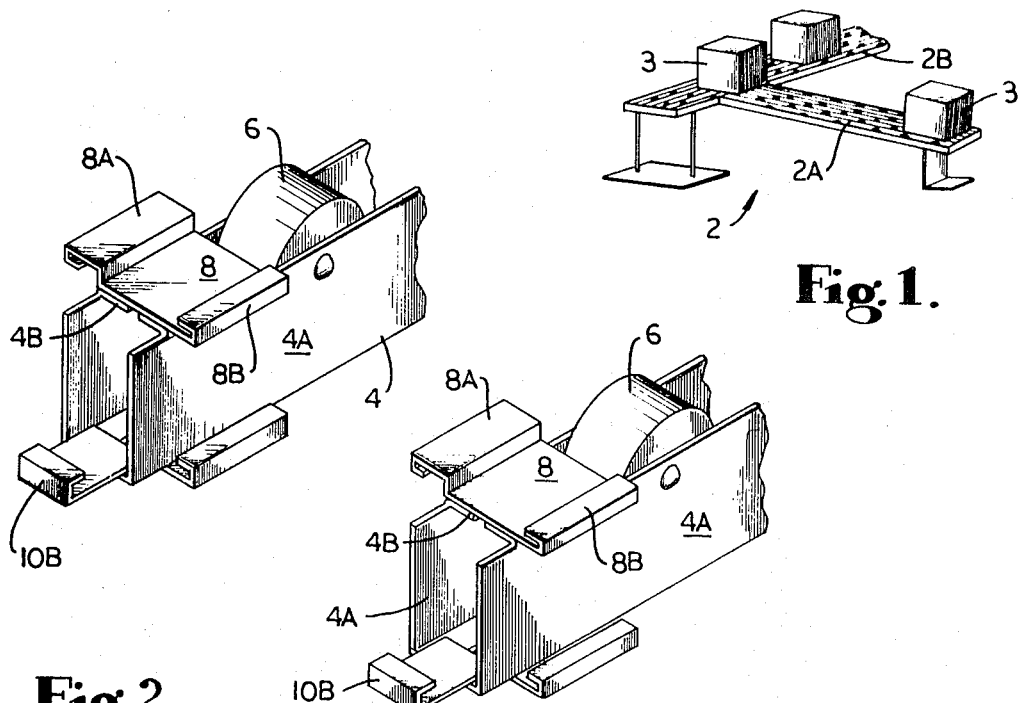
Fig. 1.
Fig. 2.
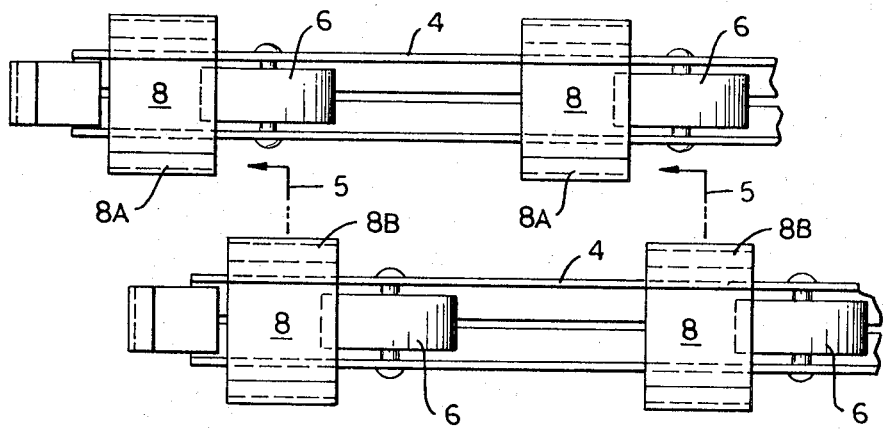
Fig. 3.
INVENTORS
RALPH W. JINDRICH
ALAN W. SPEICHER
BY  MICHAEL G. FORMAN
Woodard Weikart Emhardt & Naughton
ATTORNEYS

INVENTORS
RALPH W. JINDRICH
ALAN W. SPEICHER
BY MICHAEL G. FORMAN

Woodard, Weikart, Emhardt & Naughton
ATTORNEYS

INVENTORS
RALPH W. JINDRICH
ALAN W. SPEICHER
BY MICHAEL G. FORMAN

Woodard Weikart Emhardt & Naughton
ATTORNEYS

MATERIAL-HANDLING ASSEMBLY OF UNITS HAVING SELF-CONTAINED CONNECTORS

Background of the Invention

1. Field of the Invention

This invention is concerned with material handling or movement systems, and more specifically with units using a plurality of in-series rollers, the units being adapted to be locked together in a side-by-side and in a lengthwise relationship, to serve as conveyors, racks, dollies roller shelves and related devices.

2. Description of the Prior Art

Conveyor assemblies are widely used as a means of transporting articles from one spot to another spot. A widely used conveyor assembly generally comprises a track having a plurality of rollers journaled thereon. These prior art assemblies generally have a fixed width sufficient to accommodate the width of the article which is to be transported thereon, such as a given corrugated box. In these prior art devices, the width of the conveyor unit cannot be readily varied in order to accommodate articles of different widths.

As an example, U.S. Pat. No. 867,350 discloses a conveyor unit which incorporates a plurality of rollers. It is to be noted that in the device of this patent, provisions are made whereby a plurality of conveyor assemblies can be locked in a lengthwise relationship. However, the disclosure of this patent does not incorporate facilities for incorporating a plurality of conveyor assemblies in a side-by-side relationship.

Likewise, U.S. Pat. No. 1,028,859 and No. 2,738,103 illustrate roller type conveyor assemblies. Again the devices of these patents incorporate facilities for connecting conveyor assemblies in a lengthwise relationship. However, facilities are not provided for varying the width of a given conveyor assembly.

In contrast to this prior art, the subject invention is concerned with a conveyor unit which can be used with any number of like conveyor units and locked in a side-by-side relationship in such a fashion as to create a conveyor assembly of any desired width. They can also be used in an end-to-end, end-to-side, and alternately inverted arrangement according to the invention.

SUMMARY OF THE INVENTION

Described briefly, in a typical embodiment of the invention, a plurality of identical, roller-mounting, elongated members are assembled in side-by-side and end-to-end relationship by sliding together mating integral hook plates thereof. Various options are available, including selective or alternate inversion of units for upward as well as downward projection of rollers, swivel casters and a handle for a maneuverable dolly, and side to end connection of units.

BRIEF DESCRIPTION OF THE DRAWINGS

FIG. 1 is a simplified perspective view illustrating one example of a complete conveyor unit in accordance with this invention;

FIG. 2 is a much enlarged perspective view illustrating the end portions of a pair of conveyor units ready to be connected in side-by-side relationship in accordance with this invention;

FIG. 3 is a top view of the pair of conveyor units of FIG. 2, showing the first and second of the series of rollers and brackets typically employed in accordance with this invention;

DESCRIPTION OF THE PREFERRED EMBODIMENT

This invention is concerned with a conveyor assembly composed of a plurality of conveyor units attached to each other in such a fashion as to form a conveyor of dimensions desired. A composite conveyor 2 in accordance with this invention is illustrated in FIG. 1 as used to convey containers 3. It is formed from a pair of conveyor lengths 2A and 2B disposed at right angles to each other. The conveyor lengths are assemblies of a plurality of the conveyor units of this invention.

Figure 4:
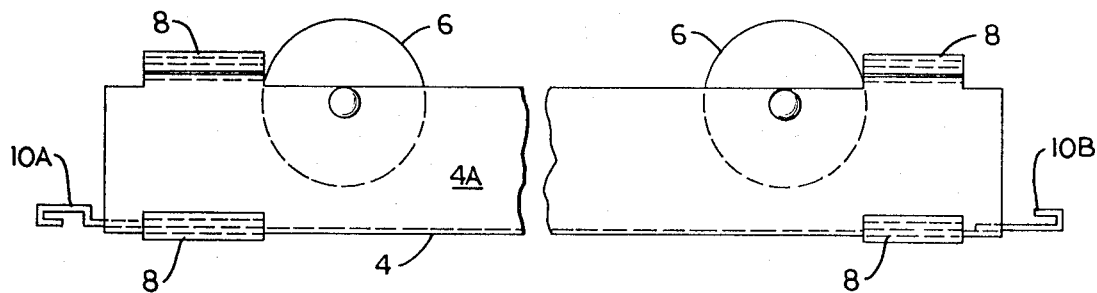
FIG. 4 is a side view of one of the units but with the center portion broken out to conserve space, and illustrating the end connector details.
Figure 5:
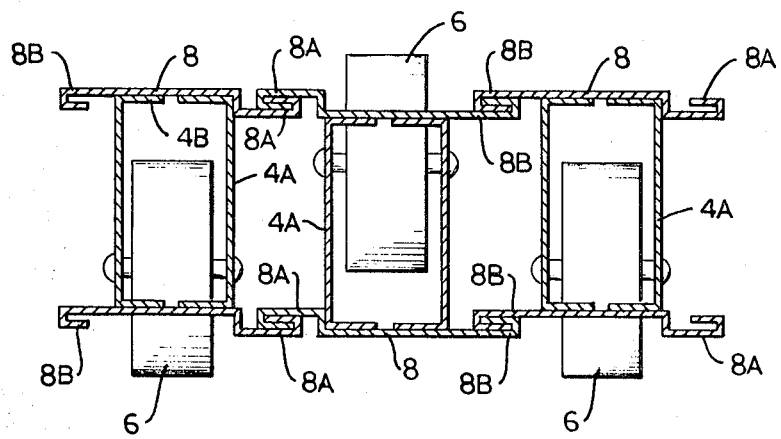
FIG. 5 is a cross section view on the same scale as FIG. 4 and illustrating three conveyor units of this invention assembled together in side-by-side relationship and with alternate units inverted to provide an assembly useful as a roller shelf or dolly.

With reference to FIGS. 2, 3, 4 and 5, the exact structure of the individual conveyor units can be seen. Each of the conveyor units of a typical embodiment of this invention is formed by a pair of rails 4A of L-shaped cross section secured in a spaced-apart parallel relationship by means of a plurality of upper and lower bracket 8 which have opposite U-shaped ends 8A and 8B. The upper brackets are welded to a plurality of inwardly turned spaced apart projections 4B which are at right angles to the plane of the main portions of rails 4A. Several rollers 6 are received on axles mounted to the rails, the rollers being provided in the space between successive upper brackets and projecting above the plane of the bracket and connector hooks as best shown in FIG. 4, where only two such rollers are shown.

U-shaped ends 8A and 8B of bracket 8 are used as a means of attaching a plurality of units in a side-by-side relationship. For an assembly of units, they are positioned so that all of the U-shaped ends of a given kind are on the same side. For example, all the straight U-shaped ends 8B which have an upwardly facing entrance are on one side while all the offset U-shaped ends having the downwardly facing entrance are on the opposite side. Due to this positioning, the U-shaped ends are compatible, being adapted to interlock with each other in such a fashion as to attach units in a side-by-side relationship.

As is specifically illustrated in FIG. 3, this attachment is effected by placing a pair of units in an offset side-by-side relationship and then moving one of the units (the lower one in FIG. 3) in the direction of arrows 5. When this movement is effected, the hooks of U-shaped ends 8A and 8B interlock with each other so that the channels are secured to each other. The attachment as illustrated here produces an assembly wherein all the rollers are on the top side of the finished assembly. Because of the interlocking of the hooks, the horizontal and vertical faces thereof extending longitudinally of the units, the faces of one hook abuttingly engaging the faces of that with which it is mated, the units cannot be pulled apart by any horizontal or vertical forces transverse of the length of the units.

In contrast with the finished assembly illustrated in FIG. 3, it is possible to lock the channels of this invention in a side-by-side relationship in such a manner that rollers are on both sides of the finished assembly. This embodiment is specifically illustrated in FIG. 5. In this illustration it can be seen that three identical units as described above, are locked in a side-by-side relationship with the straight hooks of each joined to the straight hooks of the one next adjacent, and the offset hooks of each connected to the offset hooks of the next adjacent unit, so that rollers 6 are positioned on both the top and bottom of the resulting assembly. Assemblies of this type are useful in environments where it is desirable to roll the conveyor assembly into position and thereafter use the assembly in this position for moving articles thereon. For example, this embodiment would be useful in conjunction with a truck bed where the conveyor assembly could be rolled onto the truck bed, locked into position and thereafter used to move containers in and out of the truck.

Figure 6:
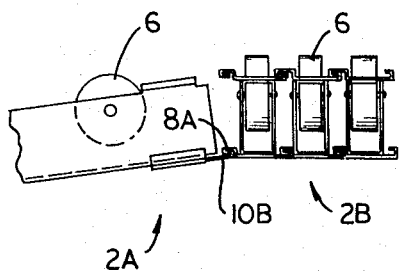
FIG. 6 is an elevational view on a scale slightly larger than FIG. 1 and smaller than FIG. 2 and illustrating a right angle connection between conveyor units of this invention.

As shown in FIG. 4, the ends of the conveyor unit incorporate brackets 10A and 10B which have U-shaped ends of virtually the same dimensions as those on brackets 8. These U-shaped ends are opposite each other in such a fashion that they are adapted to interlock with each other. By the use of these brackets, a plurality of units can be locked in an end-to-end in-series relationship. From FIG. 6 it can be seen that the right angle attachment of the conveyor units of FIG. 1 can be effected by securing an end bracket 10B to a side bracket 8A.

Figure 7:
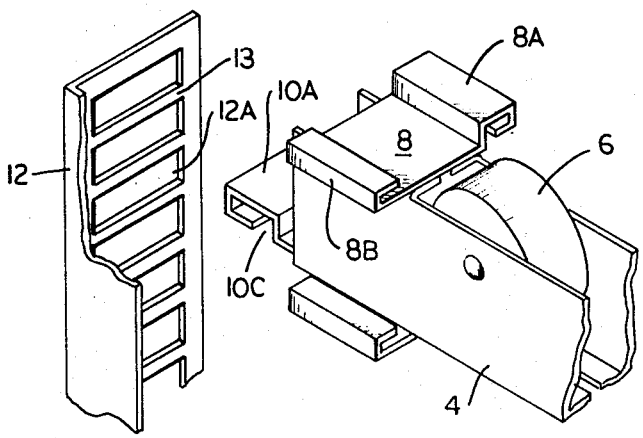
FIG. 7 is a perspective view on the same scale as FIG. 2 and illustrating the end of the conveyor unit of this invention and a portion of a vertical column disposed to receive it, to support the end of the conveyor unit.

The channels in accordance with this invention can easily be secured to various types of supports. An example is illustrated in FIG. 7, wherein a column 12 is utilized having apertures 12A therein. These apertures receive end brackets 10A of channel 4. Attachment is effected by positioning bracket 10A in aperture 12A, to such a point that the downwardly facing cutout entrance portion 10C of bracket 10A is over the crossmember 13 below the desired one of the apertures 12A. When this positioning is effected, the channel is moved downwardly slightly in such a fashion that member 13 is securely received in the column particularly by pulling the hook onto the crossmember 13.

Figure 10:
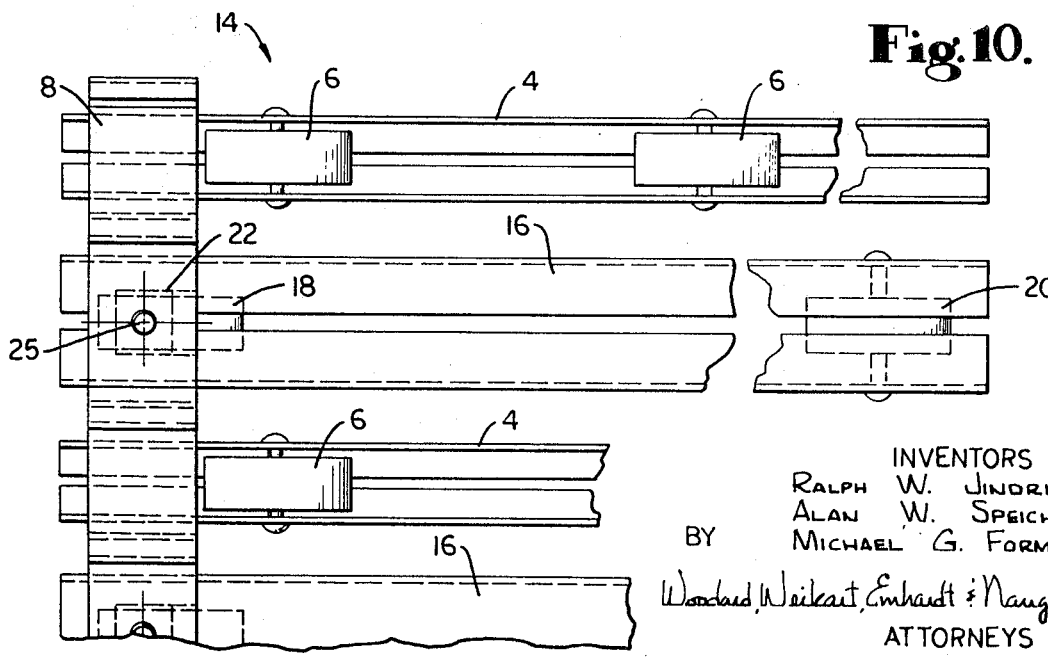
FIG. 10 is a partial top plan view of the dolly of FIGS. 8 and 9.
Figure 8:
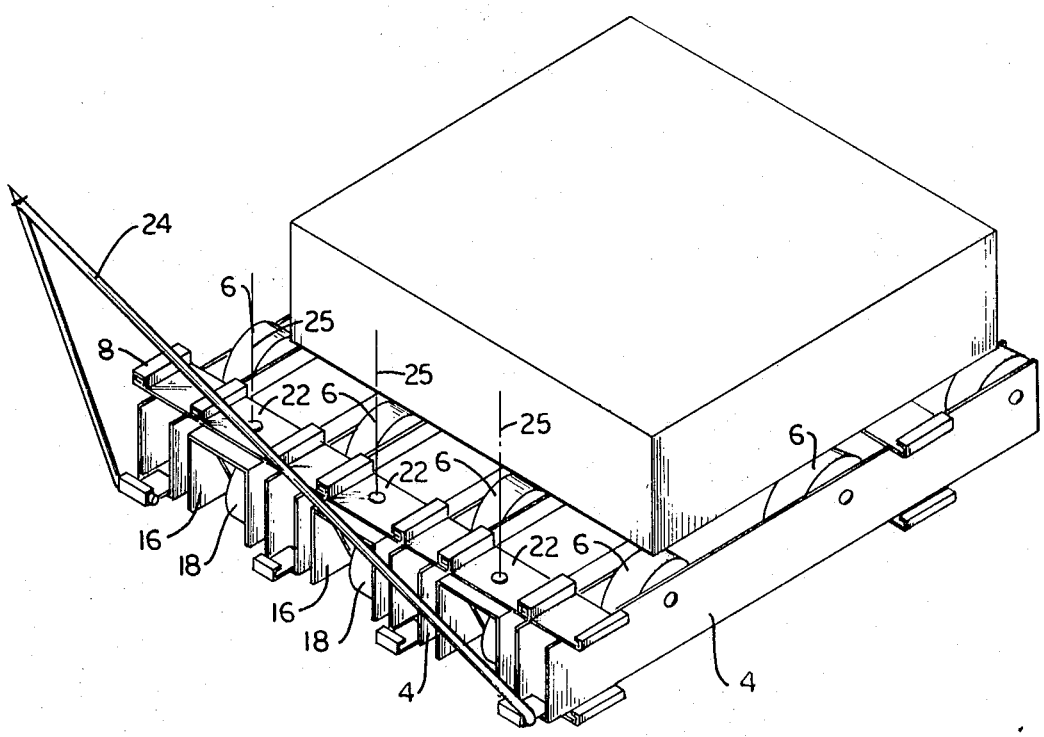
FIG. 8 is a perspective view of a dolly which is formed from an assembly of the conveyor units of this invention.
Figure 9:
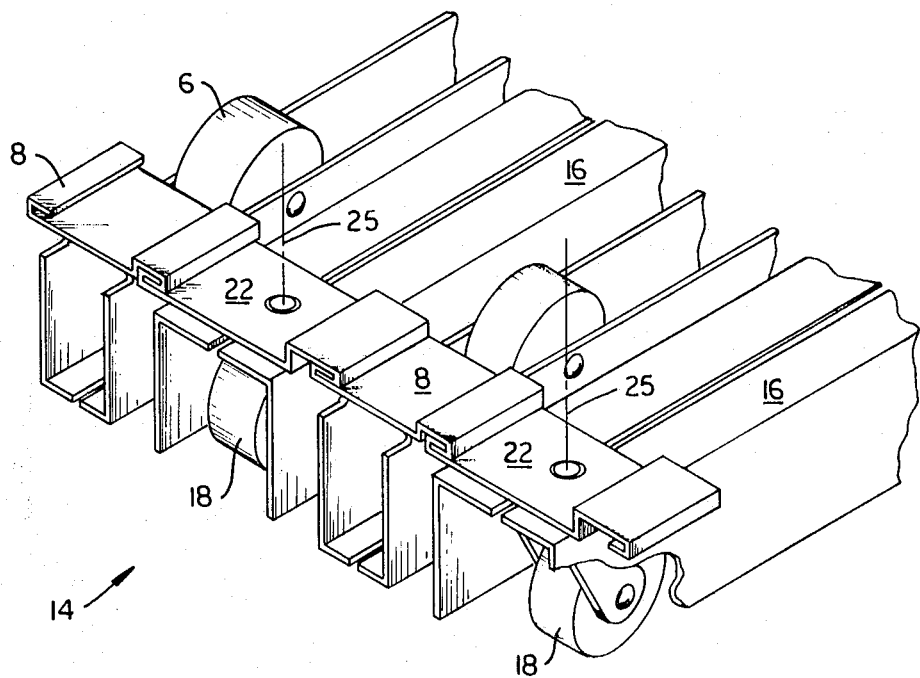
FIG. 9 is an enlarged fragmentary perspective view of the dolly of FIG. 8.

The conveyor units of this invention are also useful to form dollys. As is illustrated in FIGS. 8, 9 and 10, a composite dolly 14 of any convenient width or length can be produced using the conveyor units of this invention. For purposes of assembling a dolly, several conveyor units 4 as described above, are connected together as in FIG. 5. However, for ease of maneuverability on a warehouse floor for example, the front, downwardly projecting rollers should be swivel casters. To accommodate the turning of such casters, the conveyor units in which they are mounted should be wider than otherwise needed. As shown in FIGS. 8, 9 and 10, wide units 16 are used between standard units. They have wide brackets 22 attached thereto which have U-shaped ends that are identical to those of bracket 8 as described above. These ends are adapted to interlock with ends 8A and 8B of brackets 8 of the standard units. Bracket 22 differs from bracket 8 only in that it is wider in order to accommodate the additional width of unit 16.

Positioned in the forward end of units 16 are swivel casters 18. These swivel casters are of such a size that they can freely pivot about vertical axes 25 through brackets 22. These swivel casters allow the dolly assembly to pivot readily when lateral force is applied to the front end, as through yoke 24 of the handle assembly, the portion of the handle assembly above the yoke being omitted from the drawings. The rear end of the dolly is supported by a plurality of nonswivel casters 20 (FIG. 10), one in each of the conveyor units. It can be seen that a dolly of any convenient width or length can be formed using the conveyor units of this invention. This dolly is particularly advantageous in that its upper surface incorporates a plurality of rollers 6 which facilitate the movement of articles onto and off of the dolly.

What is claimed is:
1. Conveyor means comprising:
a first elongated member, at least two rollers mounted in said member and projecting therefrom, a first bracket affixed to said member and having oppositely opening U-shaped ends projecting from the sides of said member, a second bracket affixed to said member and having oppositely opening U-shaped ends projecting from the sides of said member, said brackets being thereby adapted to interlock with like brackets on adjacent like members to form a conveyor assembly.
2. The conveyor means of claim 1 wherein:
said elongated member is formed by a pair of facing individual L-shaped sections, the upper margins of which, at specified intervals, contain opposing projections which are at right angles to the planes of the vertical legs of said section, said projections being the locus of attachment of said first and second brackets to said member.
3. The conveyor means of claim 1 and further comprising:
third and fourth brackets having ends like the ends of said first and second brackets,
said first and second brackets being affixed to said member at the upper margin thereof, and
said third and fourth brackets being affixed to said member at the lower margin thereof.
4. The conveyor means of claim 1 and further comprising:
end connectors at opposite ends of said member, each having U-shaped ends, one of said connectors having an upwardly opening entrance and the other having a downwardly opening entrance, said end connectors being thereby adapted to interlock with mating end connectors of like conveyor members to form an extended assembly of such conveyor members.
5. A conveyor assembly comprising:
a plurality of the conveyor means of claim 1 connected together in side-by-side relationship by reception of the U-shaped ends of said brackets of each in the U-shaped ends of brackets of the conveyor means beside it.
6. The conveyor assembly of claim 5 wherein:
alternate conveyor means are inverted whereby said assembly has rollers projecting upwardly and downwardly to facilitate rolling said assembly on a floor and rolling cargo on top of said assembly while said assembly is at rest.
7. The conveyor assembly of claim 6 wherein two of said downwardly projecting rollers are swivel casters, the combination further comprising handle means connected to the assembly to provide a steerable dolly.
8. A conveyor assembly comprising:
first and second elongated conveyor units, each having connector means on the side thereof mating with connector means on the side of the other and connecting said units together in side-by-side relationship, the said connector means of said first and second units having longitudinally extending surface means, said surface means of one abuttingly engaging the surface means of the other in transverse directions, limiting relative movement of said units in transverse directions, each of said units having roller means thereon;
said units being separable by first longitudinal relative movement therebetween followed by transverse relative movement therebetween; and
said first conveyor unit having additional connector means at an end thereof, said additional connector means being formed to enable mating thereof with said connector means on the side of said second conveyor unit upon separation from side-by-side relationship and assembly in an end-of-first-unit to side-of-second unit relationship.
9. A conveyor assembly comprising:
first and second elongated conveyor units, each having connector means on the side thereof mating with connector means on the side of the other and connecting said units together in side-by-side relationship, the said connector means of said first and second units having longitudinally extending surface means, said surface means of one abuttingly engaging the surface means of the other in transverse directions, limiting relative movement of said units in transverse directions, each of said units having roller means thereon;
said second unit being inverted with respect to said first unit, with said roller means of said first unit projecting therefrom at the top of the assembly, and said roller means of said second unit projecting therefrom at the bottom of the assembly.
10. The assembly of claim 9 wherein:
at least one of said roller means is a swivel caster.
11. The assembly of claim 9 wherein:
said first and second units are substantially identical.

* * * * *